Patented July 6, 1948

2,444,660

UNITED STATES PATENT OFFICE 2,444,660

SALTS OF DITHIOCARBAMIC ACIDS

Roger A. Mathes, Akron, Ohio, assignor to The B. F. Goodrich Company, New York, N. Y., a corporation of New York No Drawing. Application March 10, 1945, Serial No. 582,168

3 Claims. (Cl. 260—429)

This invention relates to new compositions of matter and pertains specifically to the salts of dithiocarbamic acids which are addition products of carbon disulfide and aminoalkyl sulfides.

These new compositions are the salts of dithiocarbamic acids formed by the addition of carbon disulfide to the amino groups of amino-alkyl sulfides, said amino groups having at least one replaceable hydrogen.

The use of the term "salts" in the specification and claims is meant to include metallic salts such as the alkali metal salts, the alkaline earth metal salts and heavy metal salts, as well as salts with nonmetallic bases such as nitrogenous bases and especially strong organic bases which are capable of salt formation with these new dithiocarbamic acids, that is, quaternary ammonium salts, guanidine salts, and salts with amines such as aminoalkyl hydrosulfide and diaminoalkyl monosulfide and polysulfide.

These dithiocarbamic acids formed by the addition of carbon disulfide and an aminoalkyl sulfide cannot be successfully isolated because of their instability. But, as in the case of thionic acids which do not exist in the free state but do exist in the form of their derivatives, these dithiocarbamic acids are also known only in the form of their derivatives. Therefore, it is necessary either to react carbon disulfide with an aminoalkyl sulfide in the presence of a strong base such as an alkali metal hydroxide to form the alkali metal salt of the dithiocarbamic acid from which other derivatives can be made, or to react carbon disulfide with an excess of aminoalkyl sulfide to form the aminoalkyl sulfide addition product of the dithiocarbamic acid. These salts and addition products can be successfully isolated.

The reaction may be carried out either in the absence or in the presence of any of the solvents commonly used in chemical synthesis as reaction diluents, such as water, benzene, alcohol, etc. The selection of the reaction diluent is dependent upon the solubility and use of the product to be made.

The term "aminoalkyl sulfides," as used in the specification and claims, includes not only aminoalkyl hydrosulfides (or mercaptans) but also the diaminodialkyl monosulfides and polysulfides containing no more than four sulfur atoms. The amino group may have one of its hydrogen atoms replaced by a hydrocarbon group, such as methyl, ethyl, phenyl, etc. The alkyl chain between the sulfur and nitrogen atoms may contain no more than three carbon atoms, although it may have a hydrocarbon side chain such as methyl, ethyl, butyl, phenyl, etc. Among the compounds which may be used are 1,1'-diaminodimethyl mono-, di-, or tetrasulfide; 2,2'-diaminodiethyl mono-, di, or tetrasulfide; 2,2'-diamino di-n-propyl mono-, di-, or tetrasulfide; 2, 2'-diethyl 3,3'-diamino di-n-propyl mono-, di-, or tetrasulfide; 2,2'-diphenyl 3,3'-diamino di-n-propyl mono-, di-, or tetrasulfide; 3,3'-diamino di-n-propyl mono-, di-, or tetrasulfide; N,N'-diethyl 2,2'-diamino di-n-propyl mono-, di-, or tetrasulfide; aminomethyl mercaptan; 2-aminoethyl mercaptan; 2-amino n-propyl mercaptan; N-ethyl 3-amino n-propyl mercaptan; N-phenyl 2-aminoethyl mercaptan; N-methyl 2-amino n-propyl mercaptan; N-ethyl 2-aminoethyl mercaptan; 2-phenyl 3-amino n-propyl mercaptan; and other similar mercaptans.

These new compounds may be used as insecticides, fungicides, etc., but are particularly useful as accelerators for the vulcanization of rubbers. They are effective as accelerators for the vulcanization of any kind of rubber which can be vulcanized with sulfur, such as caoutchouc, balata, gutta percha, latex, artificial rubber isomers, rubber-like polymers of conjugated diene hydrocarbons, and copolymers of conjugated diene hydrocarbons with other copolymerizable monomers, such as copolymers of butadiene with either acrylonitrile, styrene, methyl acrylate, methyl methacrylate or the like. Moreover, the salts of this invention can also be used as intermediates in the preparation of a wide variety of further compounds such as esters, acid anhydrides, polysulfides, etc., of the new dithiocarbamic acids.

The following specific examples will illustrate the methods by which my new compounds can be made.

Example I 18 grams of 2,2'-diaminodiethyl monosulfide (0.15 gram molecular equivalents) are dissolved in 100 ml. of benzene and added slowly to a solution of 13.6 grams of carbon disulfide (0.18 gram molecular equivalents) in 100 ml. of benzene. The reaction takes place at once and is exothermic. The temperature of the reaction mixture is kept below 30° C. by means of an ice bath. The insoluble material that forms exhibits the properties of a dithiocarbamate, and appears to be a salt of diaminodiethyl monosulfide with di-ethylene monosulfide bis(dithiocarbamic acid). The formation of this salt can be represented by the following mechanism:

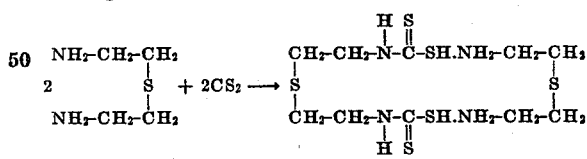

Since the dithiocarbamic acid and the amine are both bifunctional, the salt formation can occur not only in the cyclic form represented above but also in open chains of indefinite length, consequently the product as would be anticipated is of an amorphous character. The final product after removal of unreacted materials, washing with hexane and drying, consists of 27 grams of a water-soluble soft resin which represents a 92% yield.

Example II 24 grams of 2,2'-diaminodiethyl monosulfide (0.2 gram molecular equivalents) is dissolved in 140 grams of water and added to a mixture of 40 grams of carbon disulfide (0.525 gram molecular equivalents) and 17 grams of sodium hydroxide (0.425 gram molecular equivalents) in 150 grams of water. The resulting dark orange solution contains a sodium salt which is believed to be disodium di-ethylene monosulfide bis(dithiocarbamate) formed according to the following reaction:

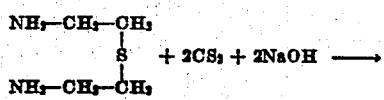

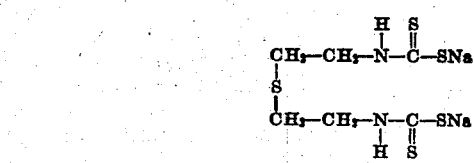

Example III

To one-half of the dark orange solution prepared in Example II there is added a solution containing 13.6 grams of zinc chloride (0.1 gram molecular equivalents) dissolved in 100 ml. of water. The white precipitate that forms is the zinc salt of the dithiocarbamic acid resulting from the addition of carbon disulfide to 2,2'-diaminodiethyl monosulfide. The formation of this salt can be represented as follows:

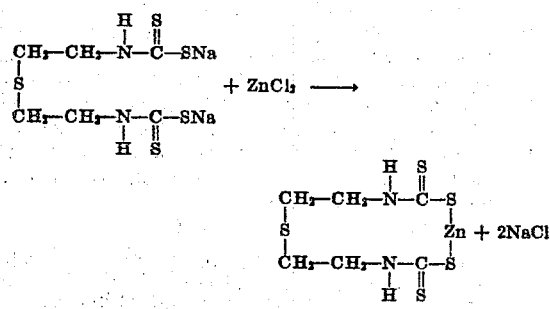

For the reasons pointed out in connection with Example I, this salt likewise is of an amorphous character. After filtering and drying, the zinc salt weighs 31.3 grams which represents a yield of 93.5%.

Substitution of equivalent quantities of any of the other aminoalkyl sulfides enumerated above in place of 2,2'-diaminodiethyl monosulfide in the above examples produces similar products by the same reaction mechanics.

The metal salts in the above examples are specific examples of metal salts which can be formed. Similar salts of other metals having water-soluble hydroxides or salts, such as potassium, calcium, magnesium, iron, lead, copper, manganese, and others, can be prepared in the same manner. Furthermore, the salts with non-metallic bases in general can easily be produced by bringing together the chloride (or hydrochloride) of the base, and the sodium salt of the dithiocarbamic acid, in a medium such as absolute alcohol in which the reagents are soluble but sodium chloride is insoluble.

As an example of the use of the salts of this invention in the preparation of other compounds, a disulfide is prepared as follows: To the remaining one-half of the dark orange solution prepared in Example II there is slowly added over a period of 30 minutes a solution containing 22.8 grams of ammonium persulfate (0.1 gram molecular equivalents) dissolved in 200 ml. of water while the temperature of the reaction mixture is kept below 15° C. The white amorphous precipitate that forms the oxidation product of the bis(dithiocarbamic acid) formed by the addition of carbon disulfide to 2,2'-diaminodiethyl monosulfide and is probably the disulfide, the formation of which can be represented as follows:

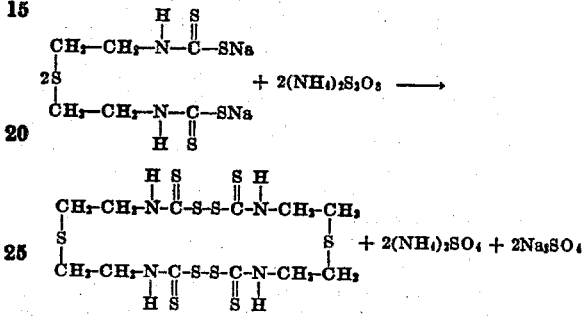

After filtering and drying, the oxidation product weighs 20.4 grams which represents a yield of 75.5%.

As an indication of the ability of these compounds to accelerate the vulcanization of rubber, I shall describe the effect produced in rubber by the products of the above examples. The soft resin of Example I is not only a good accelerator of vulcanization, particularly in the presence of carboxylic acids or their salts, but is also an efficient activator of acidic vulcanization accelerators such as the mercaptothiazole compounds. The following rubber composition, in which the parts are by weight, was prepared to illustrate the use of the aminoalkyl sulfide salt of Example I as a vulcanization accelerator:

|  | Parts |
|---|---|
| Rubber | 100 |
| Zinc oxide | 5.0 |
| Sulfur | 3.0 |
| Lauric acid | 2.0 |
| Resin of Example I as vulcanization accelerator | 1.0 |

After vulcanization at 287° F., the composition had the physical properties shown in the following table, in which T is the ultimate tensile strength in lbs./sq. in. and E is the ultimate elongation in percent.

Table I

| Time of Vulcanization in minutes | T | E |
|---|---|---|
| 15 | 2,510 | 880 |
| 30 | 3,080 | 855 |
| 60 | 2,960 | 825 |
| 90 | 3,020 | 815 |
| 120 | 2,810 | 800 |

The above composition without the vulcanization accelerator would require 3 or more hours for vulcanization and would have a tensile strength of only about 1500 to 1800 lb./sq. in.

The zinc salt of Example III was incorporated in a rubber composition having the same composition as given above except that 1.0 part of the zinc salt was used as the accelerator in place of the resin of Example I. The physical properties of this rubber composition after vulcanization at 287° F. indicate that the zinc salt is almost as good an accelerator of vulcanization as the aminoalkyl sulfide salt.

The disulfide produced by oxidation of the sodium salt as described above was incorporated into the following rubber composition in which the parts are by weight:

| | Parts |
|---|---|
| Rubber | 100 |
| Zinc oxide | 5.0 |
| Sulfur | 3.0 |
| Lauric acid | 3.0 |
| Disulfide used as vulcanization accelerator | 1.0 |

After vulcanization at 287° F., this composition had the physical properties shown in the following table, in which T is the ultimate tensile strength in lbs./sq. in. and E is the ultimate elongation in percent.

*Table II*

| Time of Vulcanization in minutes | T | E |
|---|---|---|
| 15 | 680 | 1,010 |
| 30 | 2,400 | 900 |
| 60 | 2,850 | 810 |
| 120 | 2,630 | 800 |

The above composition without a vulcanization accelerator would require 3 or more hours for vulcanization and would have a tensile strength of only about 1400 to 1700 lbs./sq. in.

Metal salts, and nitrogenous-base salts of other dithiocarbamic acids formed by the addition of carbon disulfide to any of the aminoalkyl sulfides enumerated above, as well as disulfides and other derivatives of those dithiocarbamic acids, may be employed as activators and accelerators of the vulcanization of rubber with results comparable to those given in the above examples.

The presence of a carboxylic acid such as lauric acid or other fatty acids or the metal salts thereof, although desirable, is not essential. The presence in the rubber composition of any of the usual fillers, pigments, dyes, softeners, antioxidants, other accelerators, and the like have no deleterious effect on the ability of my new compounds to accelerate vulcanization. Although small amounts of these new compounds produce appreciable effects in rubber compositions, the use of about 0.5% to 5% or more by weight is preferred.

Any of the usual methods of vulcanization, such as heating in a mold, in steam, in hot air, etc., may be employed with rubber compositions containing my new compounds. The rubber stocks thus produced are not limited in their use, but are applicable to a wide variety of products, such as pneumatic and solid tires, hose, belting, footwear, latex-dipped goods, surgical goods, all varieties of molded products, and the like.

Although I have herein disclosed specific embodiments of my invention, I do not intend to limit myself solely thereto, but to include in the appended claims all the obvious variations and modifications.

I claim:

1. The metal salts of a bis-dithiocarbamic acid which has the formula:

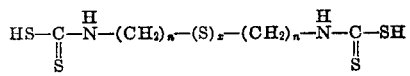

where $n$ is an integer from one to three and $x$ is an integer from one to four, said salts being selected from the group consisting of alkali metal salts, alkaline earth metal salts and salts of zinc, iron, lead, copper ad manganese.

2. The compound having the formula:

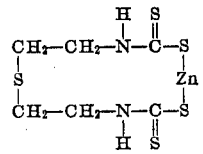

3. The compound having the formula:

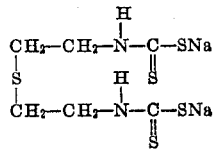

ROGER A. MATHES.

REFERENCES CITED

The following references are of record in the file of this patent:

UNITED STATES PATENTS

| Number | Name | Date |
|---|---|---|
| 1,610,216 | Elley | Dec. 7, 1926 |
| 2,313,871 | Hanford | Mar. 16, 1943 |
| 2,326,643 | Hester | Aug. 10, 1943 |
| 2,356,764 | Kern | Aug. 29, 1944 |

OTHER REFERENCES

Schneider, "Annalen der Chemie, Liebigs," vol. 386, p. 340, 1912.